United States Patent
Wei et al.

(10) Patent No.: US 7,443,146 B2
(45) Date of Patent: Oct. 28, 2008

(54) AUXILIARY TURN-ON MECHANISM FOR REDUCING CONDUCTION LOSS IN BODY-DIODE OF LOW SIDE MOSFET OF COUPLED-INDUCTOR DC-DC CONVERTER

(75) Inventors: Jia Wei, Cary, NC (US); Kun Xing, Cary, NC (US)

(73) Assignee: Intersil Americas Inc., Milpitas, CA (US)

( * ) Notice: Subject to any disclaimer, the term of this patent is extended or adjusted under 35 U.S.C. 154(b) by 174 days.

(21) Appl. No.: 11/519,516

(22) Filed: Sep. 12, 2006

(65) Prior Publication Data

US 2007/0273349 A1 Nov. 29, 2007

Related U.S. Application Data

(60) Provisional application No. 60/747,945, filed on May 23, 2006.

(51) Int. Cl.
*G05F 3/16* (2006.01)
*G05F 1/00* (2006.01)

(52) U.S. Cl. ..................... 323/224; 323/272
(58) Field of Classification Search .............. 323/224, 323/272, 284
See application file for complete search history.

(56) References Cited

U.S. PATENT DOCUMENTS 7,138,789 B2 * 11/2006 Moussaoui et al. .......... 323/272

* cited by examiner

*Primary Examiner*—Shawn Riley
(74) *Attorney, Agent, or Firm*—Paul A. Bernkopf; Graybeal Jackson Haley

(57) ABSTRACT

Conduction loss in the body-diode of a low side MOSFET of a power switching stage of one phase of a coupled-inductor, multi-phase DC-DC converter circuit, associated with current flow in the output inductor of that one phase that is induced by current flow in a mutually coupled output inductor of another phase, during normal switching of that other stage, is effectively prevented by applying auxiliary MOSFET turn-on signals, that coincide with the duration of the induced current, to that low side MOSFET, so that the induced current will flow through the turned-on low side MOSFET itself, thereby bypassing its body-diode.

16 Claims, 4 Drawing Sheets

AUXILIARY TURN-ON MECHANISM FOR REDUCING CONDUCTION LOSS IN BODY-DIODE OF LOW SIDE MOSFET OF COUPLED-INDUCTOR DC-DC CONVERTER

CROSS-REFERENCE TO RELATED APPLICATION

The present application claims the benefit of U.S. Provisional Patent Application Ser. No. 60/747,945, filed May 23, 2006, entitled: "Auxiliary Turn-On Mechanism for Reducing Conduction Loss in Body-Diode of Low Side MOSFET of Coupled-Inductor Buck-Mode Regulator," assigned to the assignee of the present application and whose disclosure is incorporated herein.

FIELD OF THE INVENTION

The present invention relates in general to DC power supply systems and subsystems thereof, and is particularly directed to a switching control mechanism for a coupled-inductor DC-DC converter.

BACKGROUND OF THE INVENTION

DC-DC converters are widely used to supply DC power to electronic devices, such as computers, printers, and the like, and are available in a variety of configurations for deriving a regulated DC output voltage from a source of input voltage. As a non-limiting example, a buck-mode or step-down DC-DC converter generates a regulated DC output voltage whose value is less than the value of the DC source voltage. A typical step-down DC-DC converter includes one or more phases or power channels, outputs of which are combined at an output node for delivering a stepped-down DC output voltage to a load. The output stage of each power channel contains power switches, current flow paths through which are controllably switched by a pulse width modulation (PWM) signal produced by a PWM modulator, in order to switchably connect a DC source voltage to one end of an output inductor, a second end of which is connected to the output node.

In addition to regulator implementations which have no mutual coupling among the inductors, there are regulator configurations which provide mutual coupling among the output inductors. These 'coupled-inductor' DC-DC converters have become increasingly attractive for supplying power to portable electronic device applications, such as, but not limited to, notebook computers, and the like, which require discontinuous current mode (DCM) operation during low or relatively light load (e.g., quiescent or 'sleep' mode) conditions, in order to reduce power loss and preserve battery life. For DCM operation, the upper and lower MOSFETs of a respective power switching stage of the converter are turned on and off for relatively brief or 'pulsed' intervals, so that a conductive path for current flow through that stage's output inductor and one or the other of the respective terminals of the input power supply is provided through one or the other of a pair of power switching MOSFETs, in a discontinuous, rather than a continuous, manner, thereby reducing output current flow to accommodate the relatively light current demand during such low load conditions.

A non-limiting example of a conventional dual-phase, coupled inductor DCM buck-mode regulator or DC-DC converter, in which the output inductors of the respective phases or power channels are mutually coupled with one another, is diagrammatically illustrated in FIG. 1. As shown therein, the dual-phase DCM regulator of FIG. 1 comprises two power channels that produce respective output currents $i_{L1}$ and $i_{L2}$, which flow from phase nodes 115 and 215 of respective power switching stages 110 and 210 of the two phase through respective output inductors L1 and L2, that are mutually coupled with one another, such that currents induced therein due to their mutual coupling flow in the same direction (from the phase nodes into the output node OUT) as the normal currents produced by the switching of the inverter stages. These two output currents are summed at an output node OUT, to produce a composite or total output current $I_{total}$ Output node OUT provides an output voltage Vo for powering a device LOAD, such as the microprocessor of a notebook computer, through which a load current $i_o$ flows.

In order to regulate the output voltage Vo, the voltage at the output node OUT is fed back to an error amplifier (EA) 310, which is operative to compare the monitored output voltage Vo with a reference voltage VID. The voltage difference output Comp of the error amplifier 310 is supplied to a supervisory controller 315. Controller 315 is operative to precisely control the pulse widths of associated streams of pulse width modulation (PWM) waveforms, that are applied by respective PWM generators within the controller to driver circuits, whose outputs are coupled to the gates of and control the on/off switching times of the upper and lower switching devices (MOSFETs Q11/Q21 and MOSFETs Q12/Q22) of the output power switching stages 110 and 210. In a typical application, the PWM waveforms are sequenced and timed such that the interval between rising edges (or in some implementations, falling edges) thereof is constant, in order to equalize the output currents $i_{L1}$ and $i_{L2}$ of the two power channels.

In addition to monitoring the output voltage Vo, error amplifier 310 monitors the output currents of the two channels via respective sense resistors Rsn1 and Rsn2 that are coupled between the phase nodes 115 and 215 and a first, non-inverting (+) input 321 of a (K gain) transconductance amplifier 320. Amplifier 320 has a second, inverting (−) input 322 coupled to the output node OUT, and a sense capacitor Csns connected across its inputs. Amplifier 320 allows the sum of the current measurements to be used to precisely regulate the output resistance in a method commonly known as droop regulation or load-line regulation. The voltage output Vdroop of the amplifier 320 is coupled to a first input 331 of a subtraction circuit 330, a second input 332 of which is coupled to the output node OUT. The Vdroop voltage output of amplifier 320 is added to the output voltage Vo to provide a difference voltage Vdiff that is coupled to a first, inverting (−) input 311 of error amplifier 310. The second, non-inverting (+) input 312 of error amplifier 310 is coupled to receive the reference voltage VID. As described above, the output voltage Comp of error amplifier 310 is used by the controller 315 to control the pulse widths of the PWM waveforms that control the on/off switching of the upper and low MOSFETs of the power switching stages 110 and 210.

These PWM waveforms are shown in FIG. 2 as including a first PWM waveform PH1, that is used to control the on/off switching of the upper MOSFET switch Q11 of the power switching stage 110 of the first phase or channel, and a second PWM waveform PH2, that is used to control the on/off switching of the upper MOSFET switch Q21 of the power switching stage 210 of the second phase. For balanced-phase operation, the frequencies of the two PWM waveforms are the same and the times of occurrence of the turn-on pulses Q11-ON of the first PWM waveform PH1 are midway between the times of occurrence of the turn-on pulses Q21-ON of the second PWM waveform PH2, and vice versa. During the intervals that the pulses of the waveforms PH1 and PH2 are high, MOSFETs Q11 and Q21 are turned on thereby, so that increasing or ramping up segments $i_{L1-1}$ and $i_{L2-1}$ of respective currents $i_{L1}$ and $i_{L2}$ flow therethrough and, via phase nodes 115 and 215, through output inductors L1 and L2 to output node OUT, as shown in FIG. 2.

As further shown in FIG. 2, when the turn-on pulse Q11-ON of the PWM waveform PH1 goes low, a PWM waveform $V_{GS\_Q12}$, that is used to control the on/off switching of the lower MOSFET switch Q12 of the power switching stage 110 of the first phase, transitions high for a prescribed period Q12-ON, corresponding to the pulse width interval of PWM waveform $V_{GS\_Q12}$. With MOSFET switch Q12 turned on during this interval, the inductor current $i_{L1}$ of the first channel gradually decreases or ramps down to zero from its peak value at the end of the duration or width of the turn-on pulse Q11-ON of PWM waveform PH1, as shown at $i_{L1-2}$. The ramping down portion $i_{L1-2}$ of the output current $i_{L1}$ is supplied by a portion $i_{S12-1}$ of a current $i_{S12}$ that flows from ground through the source-drain path of MOSFET Q12 to phase node 115 and into the inductor L1.

In like manner, when the turn-on pulse Q21-ON of the PWM waveform PH2 goes low, a PWM waveform $V_{GS\_Q22}$, that is used to control the on/off switching of the lower MOSFET switch Q22 of the power switching stage 210 of the second phase, transitions high for a prescribed period Q22-ON corresponding to the pulse width interval of PWM waveform $V_{GS\_Q22}$. With MOSFET switch Q22 turned on during this interval, the inductor current $i_{L2}$ of the second channel gradually ramps down to zero from its peak value at the end of the duration of the turn-on pulse Q21-ON of PWM waveform PH2, as shown at $i_{L2-1}$. The ramping down portion $i_{L2-2}$ of the output current $i_{L1}$ is supplied by a portion $i_{S22-1}$ of a current $i_{S22}$ that flows from ground through the source-drain path of MOSFET Q22 to phase node 215 and into the inductor L2.

As pointed out above, because the output inductor L1 of the power switching stage 110 is mutually coupled with the output inductor L2 of the power switching stage 210, the current $i_{L1}$ through inductor L1, that results from the successive PWM-controlled turn on of the MOSFETs Q11 and Q12, will induce a current in the inductor L2 of the second phase, shown in the current waveform $i_{L2}$ of FIG. 2 as induced current $i_{L2-3}$. Since the upper MOSFET Q21 of the second phase is off during this time (PH2 is low), and the polarity of its body-diode is oriented so as to inherently block the flow of current therethrough from the input voltage supply rail Vin to phase node 215, no current is drawn through the upper MOSFET Q21 to supply the induced current $i_{L2-3}$. MOSFET Q22 of the second phase is also off at this time, since its switching PWM waveform $V_{GS\_Q22}$ is low. However, the polarity orientation of its body-diode allows the flow of a current $i_{S22-2}$ from ground and through its body-diode as a body-diode current $i_{D22}$ to phase node 215 and into inductor L2 as the induced current $i_{L2-3}$ In like manner, the current $i_{L2}$ through inductor L2, that results from the successive PWM-controlled turn on of the MOSFETs Q21 and Q22, will induce a current in the inductor L1 of the first phase, shown in the current waveform $i_{L1}$ of FIG. 2 as induced current $i_{L1-3}$. Since the upper MOSFET Q11 of the first phase is off and the polarity of its body-diode is oriented so as to inherently block the flow of current therethrough from the input voltage supply rail Vin, no current is drawn through the upper MOSFET Q11 to provide the induced current $i_{L1-3}$. However, even though the lower MOSFET Q12 of the first phase is off, since its switching PWM waveform $V_{GS\_Q12}$ is low, the polarity orientation of its body-diode is such as to allow the flow of a current $i_{S12-2}$ from ground and through its body-diode as a body-diode current $i_{D12}$ to phase node 115 and into inductor L1 as the induced current $i_{L1-3}$.

Unfortunately, because the two induced currents $i_{L1-3}$ and $i_{L2-3}$ are supplied by way of respective currents $i_{D12}$ and $i_{D22}$ through the body diodes of lower MOSFETs Q12 and Q22, they cause significant conduction loss in these MOSFETs.

SUMMARY OF THE INVENTION

Pursuant to the invention, this body-diode conduction loss problem is successfully addressed by supplementing the MOSFET switching control (PWM) waveforms, through which the regulator's supervisory controller controls on/off switching of MOSFETs (e.g., low side MOSFETs) of the two power stages, with auxiliary switching signals, such as additional on-time pulse width portions of the PWM waveforms themselves, that coincide with the durations of the induced currents in the opposite phases. As a result, rather than being forced to flow as respective body-diode currents through the body-diodes of the (low side) MOSFETs, the induced currents will flow through the turned-on (low side) MOSFETs, thereby by-passing and eliminating conduction losses in their body-diodes.

In accordance with a first embodiment of the invention—for dual-phase, discontinuous mode of operation of a buck-mode regulator of the type shown in FIG. 1—the switching control operation performed by the converter's supervisory controller is augmented to include logical-OR functionality that is effective to insert, into the respective switching PWM waveforms that control the turn-on times of the low side MOSFETs, respective auxiliary on-time pulse width portions that coincide with the durations of the induced currents in the inductors of the power stages of their opposite phases. Coincidence between these auxiliary on-time pulse width portions of the PWM switching waveforms and the times during which currents are induced in the output inductors ensures that the low side MOSFETs will be turned on at the same times that currents are induced in the output inductors, so that the induced currents flow through the low side MOSFETs, rather than their body-diodes.

In accordance with a second embodiment of the invention—for the case of single-phase, discontinuous mode of operation of the buck-mode regulator of the type shown in FIG. 1—the switching control operation performed by the converter's supervisory controller is also augmented to include additional logical-OR functionality. For single-phase operation, however, normal PWM switching signals are provided for only one power switching stage of the dual-phase DCM converter embodiment. However, a current is induced in the inductor of the other power switching stage, as a result of the flow of non-induced current through the output inductor of the one power switching stage during normal operation of its upper and lower MOSFETS. In order to prevent this induced current from being supplied by way of the body-diode of the lower MOSFET of other power switching stage, the additional logical-OR functionality is used to supply an auxiliary, PWM switching signal for the low side MOSFET of the other power switching stage. The time of occurrence and duration of this auxiliary PWM switching signal is the same as the time of occurrence and duration of the induced current, so that the induced current will flow through the low side MOSFET of the other power switching stage, rather than through the body-diode of that low side MOSFET, and thereby prevent conduction loss in that MOSFET's body-diode.

A third embodiment of the invention is used for the case of single-phase, continuous conduction mode of operation of the buck-mode regulator of the type shown in FIG. 1, wherein the upper and lower MOSFETs of only one of the two power switching stages are switched in a complementary manner, so that a conductive path for current flow through the output inductor of that stage and one or the other of the respective terminals of the input power supply will be continuously provided through one or the other of these two MOSFETs. As the case of single-phase discontinuous conduction mode of operation of the regulator, for which the second embodiment of the invention is used, normal PWM switching signals are provided for only one power switching stage of the dual-phase DCM converter embodiment. Again, however, a current is induced in the inductor of the other power switching stage, as a result of the flow of non-induced current through the output inductor of the one power switching stage.

As in the second embodiment, in order to prevent this induced current from being supplied by way of the body-diode of the lower MOSFET of the other power switching stage, the switching control operation performed by the converter's supervisory controller is augmented to include additional logical-OR functionality, that supplies an auxiliary, PWM switching signal for the low side MOSFET of the other power switching stage. The time of occurrence and duration of this auxiliary PWM switching signal is the same as the time of occurrence and duration of the induced current, so that the induced current will flow through the low side MOSFET of the other power switching stage, rather than through the body-diode of that low side MOSFET, and thereby prevent conduction loss in that MOSFET's body-diode.

DETAILED DESCRIPTION

Figures 1, 2:
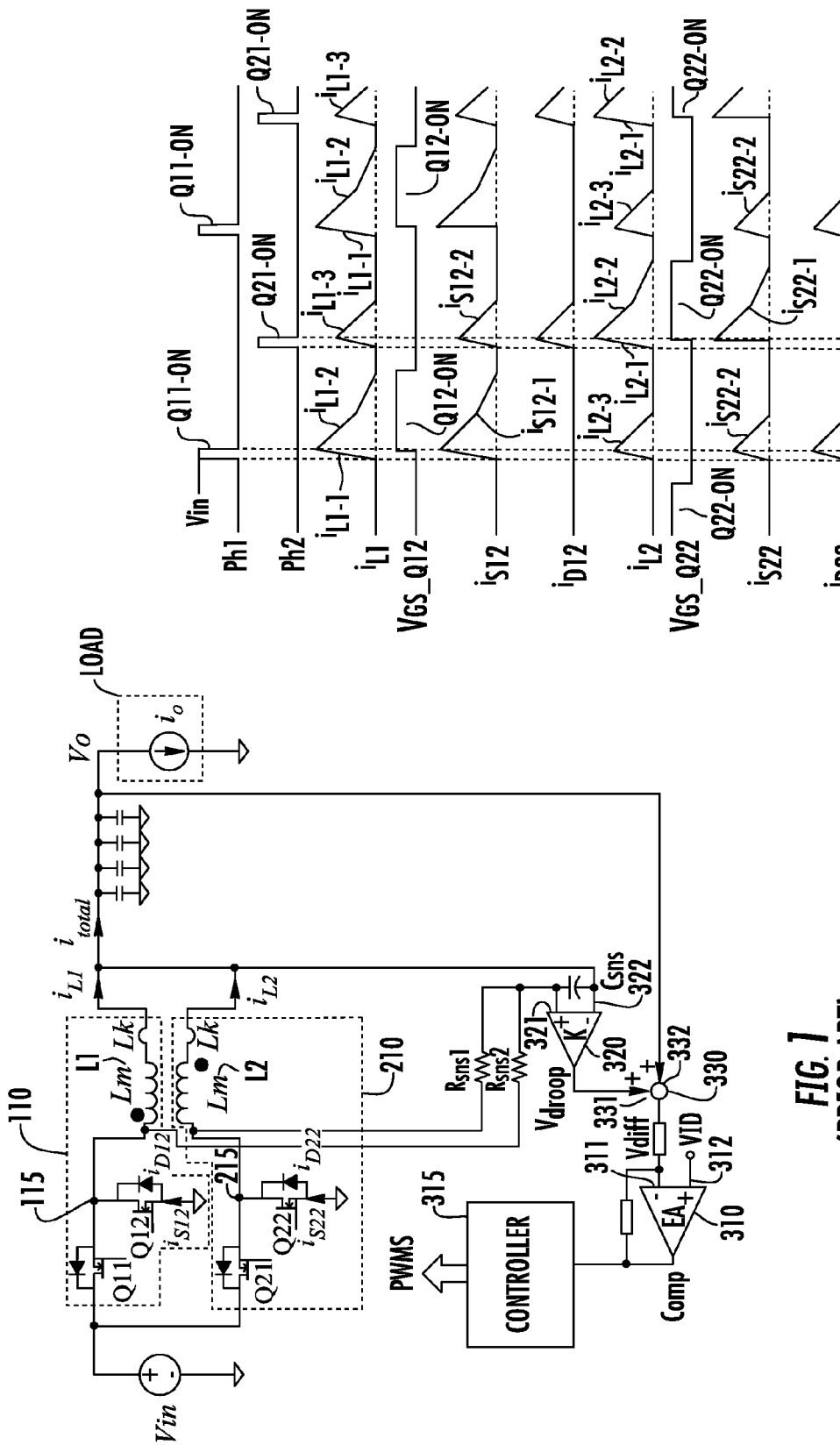
FIG. 1 diagrammatically illustrates the overall circuit architecture of a non-limiting example of a conventional dual-phase, coupled inductor, buck-mode regulator or DC-DC converter, in which the output inductors of the regulator's output power stages are mutually coupled with one another.
FIG. 2 shows waveform diagrams associated with DCM operation of the conventional dual-phase, buck-mode regulator of FIG. 1.

Before describing the details of the switching control mechanism of the present invention, it should be observed that the invention resides primarily in an augmentation of the normal switching control functionality of the supervisory controller for a coupled-inductor DC-DC converter, such as, but not limited to a buck-mode DC-DC converter, and not in a particular implementation of the controller, per se. As such, the invention has been illustrated in the drawings by readily understandable circuit architecture and associated waveform diagrams, which depict only those specific details that are pertinent to the invention, so as not to obscure the disclosure with details which will be readily apparent to those skilled in the art having the benefit of the description herein.

As described briefly above, in accordance with the present invention, the functionality of the regulator's supervisory controller is augmented, such that the PWM waveforms it produces to control the on/off switching of the low side MOSFETs of the power stages include auxiliary pulse signals having widths that coincide with the durations of the induced currents in the opposite phases. As a result, rather than flowing as respective body-diode currents through the body-diodes of the MOSFETs, the induced currents flow instead through the turned-on MOSFETs, thereby eliminating conduction losses in their body-diodes.

Figures 3, 4:
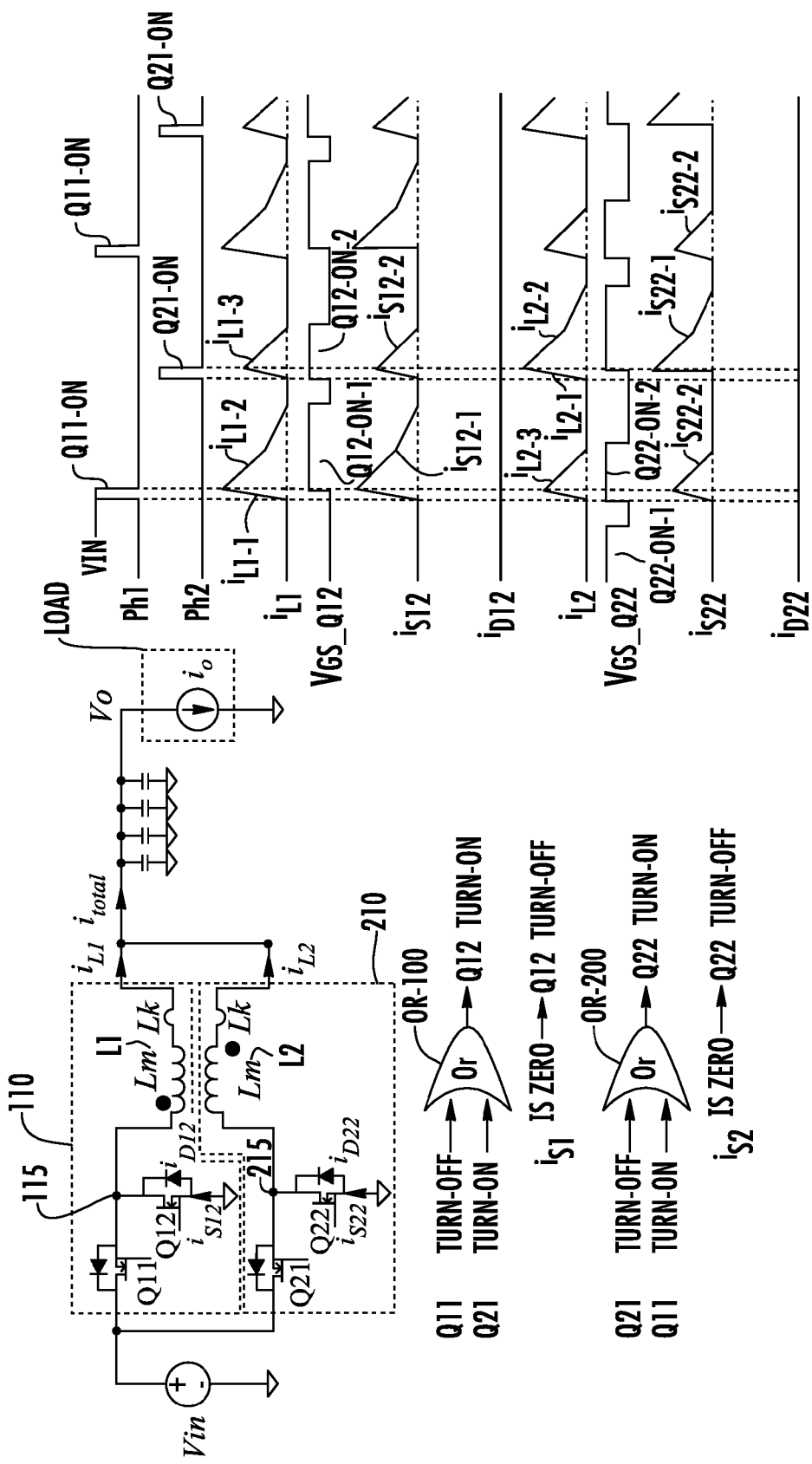
FIG. 3 is a reduced complexity, diagrammatic illustration of a first embodiment of the invention for the case of dual-phase DCM operation of a buck-mode regulator of the type shown in FIG. 1.
FIG. 4 shows waveform diagrams associated with DCM operation of the dual-phase, buck-mode regulator of FIG. 3.

Attention is initially directed to FIG. 3 which is a reduced complexity, diagrammatic illustration of a first embodiment of the invention for the case of a dual-phase, discontinuous conduction mode of operation of a (buck-mode type of) regulator of FIG. 1, described above, and FIG. 4, which shows a set of waveform diagrams associated with the operation of FIG. 3. More particularly, the circuit architecture diagram of FIG. 3 shows the two phases of the DCM regulator architecture of FIG. 1, but omits an illustration of the feedback connections to the supervisory switching controller, to simplify the drawing.

Instead, the augmentation of the functionality of the supervisory controller (315 in FIG. 1) is represented in FIG. 3 by a pair of OR gate functions OR-100 and OR-200, that are employed by the supervisory controller to insert additional or auxiliary on-time pulse width portions into the respective switching PWM waveforms $V_{GS\_Q12}$ and $V_{GS\_Q22}$, and are effective to turn on the low side MOSFETs Q12 and Q22 of respective power switching stages 110 and 210, at times that coincide with the durations of the induced currents in the inductors of the power stages of their opposite phases.

To this end, the OR gate function OR-100 for power switching stage 110 has a first input coupled to monitor the turning-off of the upper switching MOSFET Q11, which occurs at a high-to-low transition of the pulse Q11-ON of PWM waveform PH1, and a second input coupled to monitor the turning-on of the upper switching MOSFET Q21 of the opposite power stage 210, which occurs at a low-to-high transition of the pulse Q21-ON of PWM waveform PH2. When either of these events occurs, the PWM waveform $V_{GS\_Q12}$, that is used to control the on/off switching of lower switching MOSFET switch Q12 of power switching stage 110, transitions from low-to-high.

In particular, in response to a high-to-low transition of the pulse Q11-ON of PWM waveform PH1, the PWM waveform $V_{GS\_Q12}$ transitions from low-to-high for a first pulse width interval Q12-ON-1; in addition, in response to a low-to-high transition of the pulse Q21-ON of PWM waveform PH2, PWM waveform $V_{GS\_Q12}$ transitions from low-to-high for a second or auxiliary pulse width interval Q12-ON-2. As a consequence, both the ramping down portion $i_{L1-2}$ of the non-induced current ($i_{L1-1}+i_{L1-2}$) through inductor L1 and the entirety of the current $i_{L1-3}$ induced therein by the non-induced current ($i_{L2-1}+i_{L2-2}$) flowing through inductor L2 will flow through the source-drain path of lower MOSFET Q12.

None of the induced current flowing through inductor L1 will flow as a body-diode current $i_{D12}$ through the body-diode of MOSFET Q12, so as to eliminate an associated conduction loss in the body-diode of MOSFET Q12. To control the turn-off of the lower MOSFET switch Q12, its source-drain current $i_{S12}$ is monitored. Whenever the source-drain current $i_{S12}$ goes to zero, the PWM waveform $V_{GS\_Q12}$ transitions from high-to-low, so that the lower MOSFET switch Q12 is turned off.

In a like manner, the OR gate function OR-200 for power switching stage 210 has a first input coupled to monitor the turning-off of the upper switching MOSFET Q21, which occurs at a high-to-low transition of the pulse Q21-ON of PWM waveform PH2, and a second input coupled to monitor the turning-on of the upper switching MOSFET Q11 of the opposite power switching stage 110, which occurs at a low-to-high transition of the pulse Q11-ON of PWM waveform PH1. When either of these events occurs, the PWM waveform $V_{GS\_Q22}$, that is used to control the on/off switching of the lower switching MOSFET switch Q22 of power switching stage 210, transitions from low-to-high.

More particularly, in response to a high-to-low transition of the pulse Q21-ON of PWM waveform PH2, the PWM waveform $V_{GS\_Q22}$ transitions from low-to-high for a first pulse width interval Q22-ON-1; in addition, in response to a low-to-high transition of the pulse Q11-ON of PWM waveform PH1, PWM waveform $V_{GS\_Q22}$ transitions from low-to-high for a second or auxiliary pulse width interval Q22-ON-2. As a consequence, both the ramping down portion $i_{L2-2}$ of the non-induced current ($i_{L2-1}+i_{L2-2}$) through inductor L2 and the entirety of the current $i_{L2-3}$ induced therein by the non-induced current ($i_{L1-1}+i_{L1-2}$) flowing through inductor L1 will flow through the source-drain path of lower MOSFET Q22. None of the induced current flowing through inductor L2 will flow as a body-diode current $i_{D22}$ through the body-diode of MOSFET Q22, so as to eliminate an associated conduction loss in the body-diode of MOSFET Q22. To control the turn-off of the lower MOSFET switch Q22, its source-drain current $i_{S22}$ is monitored. Whenever the source-drain current $i_{S22}$ goes to zero, the PWM waveform $V_{GS\_Q22}$ transitions from high-to-low, so that the lower MOSFET switch Q22 is turned off.

Figures 5, 6:
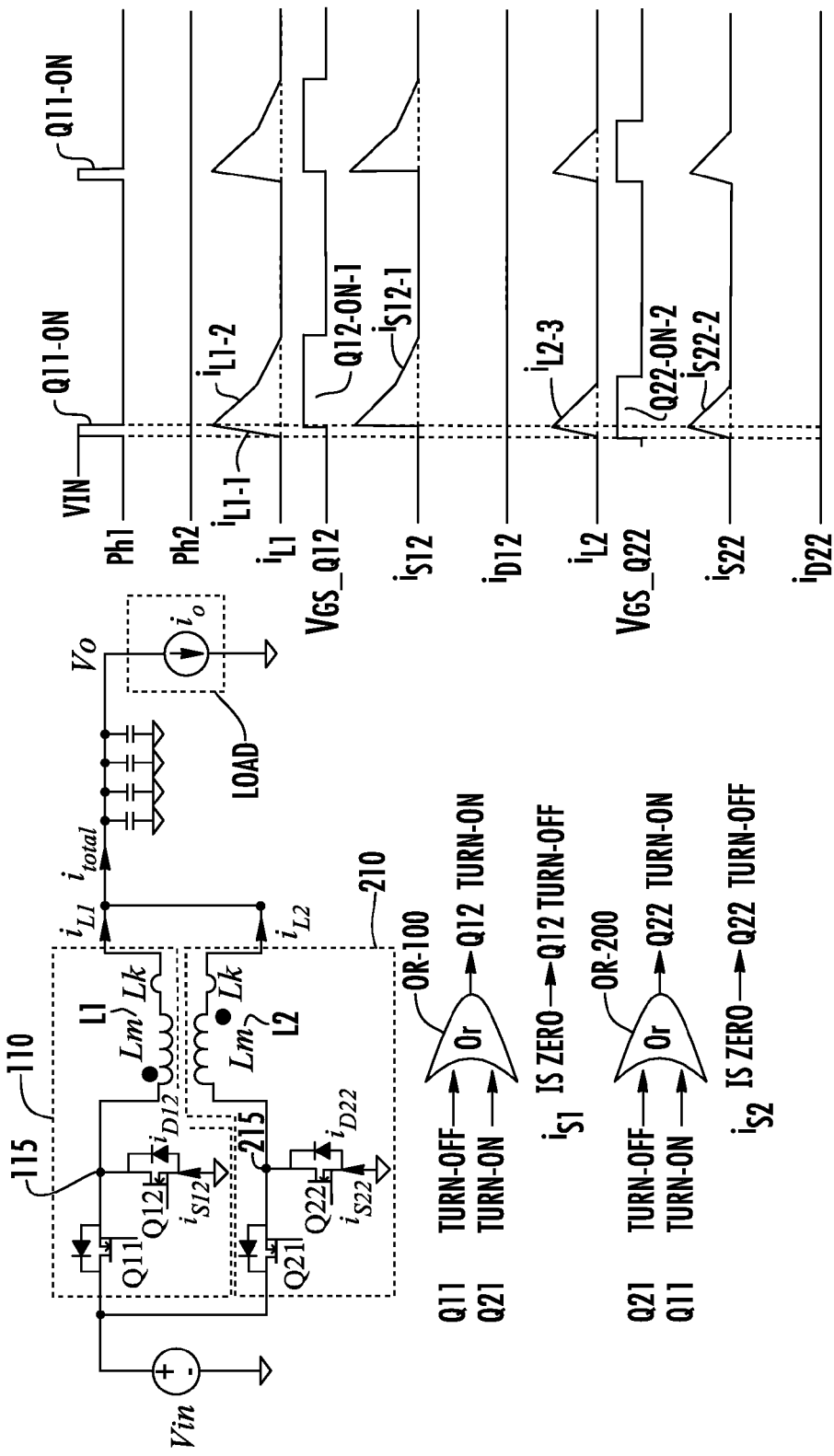
FIG. 5 is a reduced complexity, diagrammatic illustration of a second embodiment of the invention for the case of single phase DCM operation of the buck-mode regulator shown in FIG. 3.
FIG. 6 shows waveform diagrams associated with the single phase DCM operation of the buck-mode regulator of FIG. 5.

The circuit architecture diagram of FIG. 5 and its associated set of waveforms shown in FIG. 6 correspond to the case of providing normal PWM switching signals for only one of the power switching stages—power stage 110—of the dual-phase discontinuous conduction mode converter embodiment of FIGS. 3 and 4, described above. In this second embodiment of the invention, there is no PH2 pulse for turning on the upper MOSFET switch Q21 of power switching stage 210. As such, the inputs to OR gate functions OR-100 and OR-200 associated with the turn-on and turn-off of MOSFET Q21 are zero. Moreover, since there is no PH2 pulse that initiates the flow of non-inducted current $I_{L2}$ through the inductor L2, the PWM waveform $V_{GS\_Q22}$ does not transition from low-to-high for a prescribed duration Q22-ON-1 associated with the ramp down of a (non-existent) non-induced portion of current $i_{L2}$ through the inductor L2 at the end of the (non-existent) PH2 pulse (since there is no non-induced current $i_{L2}$ flowing through inductor L2 to begin with). As a consequence, the PWM waveform $V_{GS\_Q12}$ for lower MOSFET switch Q12 of power switching stage 110 does not require an auxiliary pulse width portion (shown at Q12-ON-2 in FIG. 4), to turn on the lower MOSFET switch Q12 of power switching stage 210 to accommodate a (non-existent) induced current through inductor L1.

However, in the second, single-phase DCM embodiment of FIGS. 5 and 6, there is an induced current $i_{L2-3}$ that flows through the inductor L2 of the power switching stage 210, as a result of the flow of the non-induced current $i_{L1}$ through inductor L1 during the normal operation of the upper and lower MOSFETS Q11 and Q12 of power switching stage 110. In order to prevent this induced current $i_{L2-3}$ from being supplied by way of the body-diode of the lower MOSFET Q22 of power switching stage 210, the pulse width portion Q22-ON-2 of the PWM waveform $V_{GS\_Q22}$ of the first, dual phase DCM embodiment FIGS. 3 and 4 is used in the second, single-phase DCM embodiment of FIGS. 5 and 6 to turn on and provide for the flow of source-drain current $i_{S22}$ through the lower MOSFET Q22 during the induced current $i_{L2-3}$. The time of occurrence and duration of the pulse width Q22-ON-2 of PWM waveform $V_{GS\_Q22}$ is the same as the time of occurrence and duration of the induced current $i_{L2-3}$, as in the first embodiment of FIGS. 3 and 4. As a result, as in the first embodiment of FIGS. 3 and 4, all of the induced current ($i_{L2-3}=i_{S22-2}$) flowing through inductor L2 will flow through turned-on low side MOSFET Q22, rather than through its body-diode as a body-diode current $i_{D22}$, so as to eliminate an associated conduction loss in the body-diode of MOSFET Q22.

Figures 7, 8:
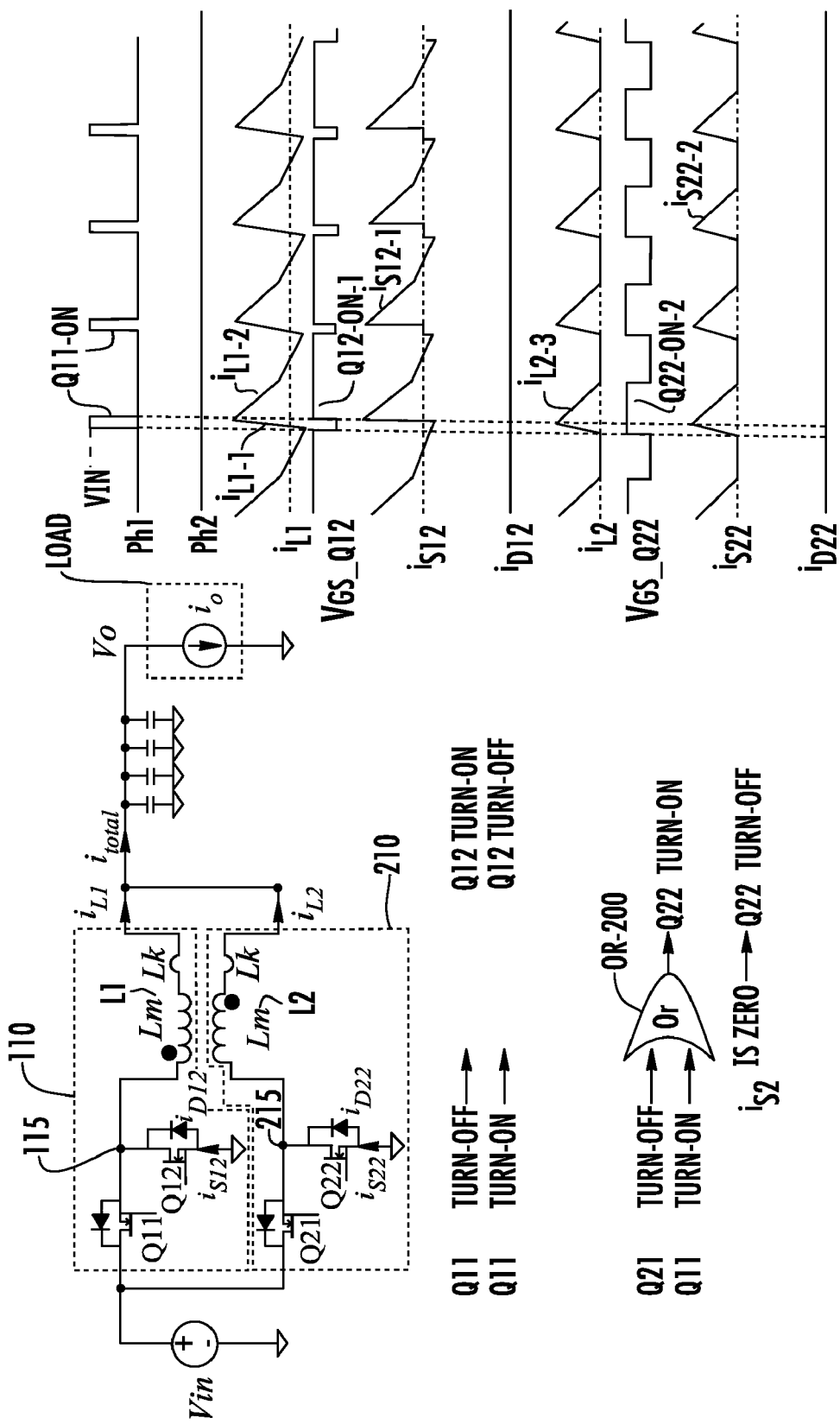
FIG. 7 is a reduced complexity, diagrammatic illustration of a third embodiment of the invention for the case of a single phase CCM operation of the buck-mode regulator shown in FIG. 3.
FIG. 8 shows waveform diagrams associated with the single phase CCM operation of the buck-mode regulator of FIG. 7.

FIG. 7 is a reduced complexity, diagrammatic illustration of a third embodiment of the invention for the case of a single phase CCM operation of the buck-mode regulator, while FIG. 8 shows a set of waveform diagrams associated with the operation of the circuit architecture of FIG. 7. For CCM single-phase operation, the upper and lower MOSFETs Q11 and Q12 of power switching stage 110 are turned on and off in a complementary manner, so that a conductive path for current flow through the inductor L1 and one or the other of the respective terminals (Vin and ground) of the input power supply will be continuously provided through one or the other of these MOSFETs. Thus, the inductor current $i_{L1}$ through output inductor L1 is repetitively ramped up and down between positive and negative peaks thereof, as the complementary PWM waveforms PH1 and $V_{GS\_Q12}$ alternately turn MOSFETs Q11 and Q12 on and off, as shown in the waveform diagram of FIG. 8.

Similar to the diagrammatic illustrations of the respective dual-phase and single-phase DCM embodiments of FIGS. 3 and 5, the circuit architecture diagram of FIG. 7 is essentially the same as the DCM buck-mode regulator of FIG. 1, but omits an illustration of the feedback connections to the supervisory controller, in order to simplify the drawing. Instead, as in the circuit architecture diagrams of FIGS. 3 and 5, FIG. 7 shows a control diagram representative of the control function that is executed by the supervisory controller, to control the turn-on and turn-off times of the high side MOSFET Q11 and the low side MOSFET Q12 of power switching stage 110 by respective PWM complementary switching waveforms PH1 and $V_{GS\_Q12}$, as well as the OR gate function OR-200 that is used to control auxiliary turn-on and turn-off times of the low side MOSFET Q22 of the power switching stage 210, in accordance with PWM waveform $V_{GS\_Q22}$, at times that coincide with the durations of currents induced in inductor L2 of power switching stage 210.

More particularly, as in the single-phase DCM regulator embodiment of FIGS. 5 and 6, in the single-phase CCM regulator embodiment of FIGS. 7 and 8, there is no PH2 pulse for turning on the upper MOSFET switch Q21 of power switching stage 210. As such, the input to OR-gate function OR-200 associated with the turn-off of MOSFET Q21 is zero. Moreover, since there is no PH2 pulse that initiates the flow of non-inducted current $I_{L2}$ through the inductor L2, the PWM waveform $V_{GS\_Q22}$ does not transition from low-to-high for a prescribed duration Q22-ON-1 associated with the ramp down of a (non-existent) non-induced portion of current $i_{L2}$ through the inductor L2 at the end of the (non-existent) PH2 pulse (since there is no non-induced current $i_{L2}$ flowing through inductor L2 to begin with). As a consequence, the PWM waveform $V_{GS\_Q12}$ for lower MOSFET switch Q12 of power switching stage 110 does not require an auxiliary pulse width portion (shown at Q12-ON-2 in FIG. 4), to turn on the lower MOSFET switch Q12 of power switching stage 210 to accommodate a (non-existent) induced current through inductor L1.

However, as in the single-phase DCM embodiment of FIGS. 5 and 6, there is an induced current $i_{L2-3}$ that flows through the inductor L2 as a result of the flow of the non-induced current $i_{L1}$ through inductor L1 during the normal operation of the upper and lower MOSFETS Q11 and Q12 of power switching stage 110. In order to prevent this induced current $i_{L2-3}$ from being supplied by way of the body-diode of the lower MOSFET Q22 of power switching stage 210, the pulse width portion Q22-ON-2 of the PWM waveform $V_{GS\_Q22}$ of FIG. 4 is again used to turn on and provide for the flow of source-drain current $i_{S22}$ through the lower MOSFET Q22 during the induced current $i_{L2-3}$. The time of occurrence and duration of the pulse width Q22-ON-2 of PWM waveform $V_{GS\_Q22}$ is the same as the time of occurrence and duration of the induced current $i_{L2-3}$, as in the embodiments of FIGS. 3-6. As a result, as in the embodiments of FIGS. 3-6, all of the induced current ($i_{L2-3}=i_{S22-2}$) flowing through inductor L2 will flow through turned-on low side MOSFET Q22, rather than through its body-diode as a body-diode current $i_{D22}$, eliminating conduction loss in the body-diode of MOSFET Q22.

As will be appreciated from the foregoing description, the problem of body-diode conduction loss in a coupled-inductor DC-DC converter is successfully overcome in accordance with the present invention, by incorporating into the MOSFET switching control (PWM) waveforms, through which the regulator's supervisory controller controls on/off switching of the low side MOSFETs of the two power stages, auxiliary on-time pulse width portions, that coincide with the durations of the induced currents in the opposite phases. As a result, rather than being forced to flow as respective body-diode currents through the body-diodes of the MOSFETs, the induced currents will flow through the turned-on MOSFETs themselves, thereby eliminating conduction losses in their body-diodes.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A DC-DC converter comprising:
  a plurality of power switching stages, each of which includes a plurality of output power switches having current flow paths therethrough coupled through respective mutually-coupled output inductors to an output node; and
  a controller that is operative to apply primary switching signals to power switches of at least one of said power switching stages for controlling times during which power switches thereof are conductive to provide current flow paths therethrough, said controller including logical functionality operative to monitor on/off stages of transistors comprising said power switches and to provide auxiliary switching signals that are effective to turn-on a first power switch of a first output power switching stage, in association with induced current in the output inductor of said first output power switching stage resulting from current flow through a mutually coupled inductor of a second output power switching stage, wherein said induced current is prevented from flowing through a body-diode of said first power switch of said first output power switching stage.

2. The DC-DC converter according to claim 1, wherein said logical functionality comprises OR gates.

3. The DC-DC converter according to claim 1, wherein said controller is operative to apply said primary switching signals to power switches of each of said plurality of output power switching stages for controlling times during which power switches thereof are conductive to provide current flow paths therethrough, said controller being further operative to provide auxiliary switching signals that are effective to turn-on a power first switch of each of said plurality of output power switching stages, in association with induced current in the output inductor of said each output power switching stage resulting from current flow through a mutually coupled inductor of another of each of said output power switching stages, wherein said induced current is prevented from flowing through a body-diode of said first power switch of said each output power switching stage.

4. The DC-DC converter according to claim 1, wherein said DC-DC converter comprises a multi-phase, discontinuous mode buck-mode DC-DC converter, said primary switching signals comprising pulse width modulation (PWM) waveforms, and wherein said controller is operative to generate said auxiliary signals as auxiliary on-time pulse width portions inserted into PWM waveforms applied to power switches of said plurality of output power switching stages for controlling times during which power switches thereof are conductive to provide current flow paths therethrough, said auxiliary on-time pulse width portions being effective to turn-on first power switches of respective ones of said plurality of output power switching stages, in association with induced current in the output inductor of said respective ones of said output power switching stage resulting from current flow through a mutually coupled inductor of another output power switching stage, wherein said induced current is prevented from flowing through body-diodes of said first power switches of said respective ones of said plurality of output power switching stages.

5. The DC-DC converter according to claim 1, wherein said DC-DC converter comprises a single-phase, discontinuous mode buck-mode DC-DC converter, wherein said controller is operative to apply said primary switching signals as discontinuous pulse width modulation (PWM) waveforms to only a first of said output power switching stages for controlling times during which power switches thereof are conductive to provide current flow paths therethrough, and wherein said controller is further operative to generate said auxiliary signals as auxiliary PWM switching signals that are applied to a first power switch of a second of said output power switching stages for controlling times during which said first power switch is conductive to provide a current flow path therethrough, said auxiliary PWM switching signals being effective to turn-on said first power switch of said second output power switching stage, in association with induced current in the output inductor of said second of said output power switching stage resulting from current flow through a mutually coupled inductor of said first output power switching stage, wherein said induced current is prevented from flowing through a body-diode of said first power switch of said second output power switching stage, so as to reduce conduction loss therein.

6. The DC-DC converter according to claim 1, wherein said DC-DC converter comprises a single-phase, continuous mode buck-mode DC-DC converter, wherein said controller is operative to apply said primary switching signals as complementary pulse width modulation (PWM) waveforms to respective power switches of only a first of said output power switching stages for controlling times during which said respective power switches thereof are conductive to provide current flow paths therethrough, and wherein said controller is further operative to generate said auxiliary signals as auxiliary PWM switching signals that are applied to a first power switch of a second of said output power switching stages for controlling times during which said first power switch of said second output power switching stage is conductive to provide a current flow path therethrough, said auxiliary PWM switching signals being effective to turn-on said first power switch of said second output power switching stage, in association with induced current in the output inductor of said second of said output power switching stage resulting from current flow through a mutually coupled inductor of said first output power switching stage, wherein said induced current is prevented from flowing through a body-diode of said first power switch of said second output power switching stage.

7. In a DC-DC converter having a plurality of power switching stages, each of which includes a plurality of output power switches having current flow paths therethrough coupled through a respective output inductor to an output node, and wherein multiple ones of said output inductors are mutually coupled to one another, so that current through a first output inductor induces current in a second output inductor, and a controller that is operative to apply primary switching signals to power switches of at least one of said output power switching stages for controlling times during which said power switches are conductive to provide current flow paths therethrough, the improvement wherein:

said controller is operative to generate auxiliary switching signals that are effective to turn-on a first power switch of a first output power switching stage, in association with induced current in the output inductor of said first output power switching stage resulting from current flow through a mutually coupled inductor of a second output power switching stage, wherein said induced current is prevented from flowing through a body-diode of said first power switch of said first output power switching stages.

8. The improvement according to claim 7, wherein said controller is operative to apply said primary switching signals to power switches of each of said plurality of output power switching stages for controlling times during which power switches thereof are conductive to provide current flow paths therethrough, and is operative to apply said auxiliary switching signals to a first power switch of each of said plurality of output power switching stages and thereby turn-on said power first switch of each of said plurality of output power switching stages, in association with induced current in the output inductor of said each output power switching stage resulting from current flow through a mutually coupled inductor of another of each of said output power switching stages, wherein said induced current is prevented from flowing through a body-diode of said first power switch of said each output power switching stages.

9. The improvement according to claim 7, wherein said DC-DC converter comprises a multi-phase, discontinuous mode buck-mode DC-DC converter, said primary switching signals comprise pulse width modulation (PWM) waveforms, and wherein said controller is operative to generate said auxiliary signals as auxiliary on-time pulse width portions inserted into PWM waveforms applied to power switches of said plurality of output power switching stages for controlling times during which power switches thereof are conductive to provide current flow paths therethrough, said auxiliary on-time pulse width portions being effective to turn-on first power switches of respective ones of said plurality of output power switching stages, in association with induced current in the output inductor of said respective ones of said output power switching stage resulting from current flow through a mutually coupled inductor of another output power switching stage, wherein said induced current is prevented from flowing through body-diodes of said first power switches of said respective ones of said plurality of output power switching stages.

10. The improvement according to claim 7, wherein said DC-DC converter comprises a single-phase, discontinuous mode buck-mode DC-DC converter, wherein said controller is operative to apply said primary switching signals as discontinuous pulse width modulation (PWM) waveforms to only a first of said output power switching stages for controlling times during which power switches thereof are conductive to provide current flow paths therethrough, and wherein said controller is further operative to generate said auxiliary signals as auxiliary PWM switching signals that are applied to a first power switch of a second of said output power switching stages for controlling times during which said first power switch is conductive to provide a current flow path therethrough, said auxiliary PWM switching signals being effective to turn-on said first power switch of said second output power switching stage, in association with induced current in the output inductor of said second of said output power switching stage resulting from current flow through a mutually coupled inductor of said first output power switching stage, wherein said induced current is prevented from flowing through a body-diode of said first power switch of said second output power switching stage.

11. The improvement according to claim 7, wherein said DC-DC converter comprises a single-phase, continuous mode buck-mode DC-DC converter, wherein said controller is operative to apply said primary switching signals as complementary pulse width modulation (PWM) waveforms to respective power switches of only a first of said output power switching stages for controlling times during which said respective power switches thereof are conductive to provide current flow paths therethrough, and wherein said controller is further operative to generate said auxiliary signals as auxiliary PWM switching signals that are applied to a first power switch of a second of said output power switching stages for controlling times during which said first power switch of said second output power switching stage is conductive to provide a current flow path therethrough, said auxiliary PWM switching signals being effective to turn-on said first power switch of said second output power switching stage, in association with induced current in the output inductor of said second of said output power switching stage resulting from current flow through a mutually coupled inductor of said first output power switching stage, wherein said induced current is prevented from flowing through a body-diode of said first power switch of said second output power switching stage.

12. A method of controlling the operation of a DC-DC converter having a plurality of power switching stages, each of which includes a plurality of output power switches having current flow paths therethrough coupled through a respective output inductor to an output node, and wherein multiple ones of said output inductors are mutually coupled to one another, so that current through a first output inductor induces current in a second output inductor, said method comprising the steps of:

(a) applying primary switching signals to power switches of at least one of said output power switching stages so as to control times during which said power switches are conductive to provide current flow paths therethrough; and (b) generating, in association with induced current in the output inductor of said first output power switching stage resulting from current flow through a mutually coupled inductor of a second output power switching stage, auxiliary switching signals that are effective to turn-on a first power switch of a first output power switching stage, wherein said induced current is prevented from flowing through a body-diode of said first power switch of said first output power switching stages.

13. The method according to claim 12, wherein said step (a) comprises applying said primary switching signals to power switches of each of said plurality of output power switching stages for controlling times during which power switches thereof are conductive to provide current flow paths therethrough, and said step (b) comprises applying said auxiliary switching signals to a first power switch of each of said plurality of output power switching stages and thereby turn-on said power first switch of each of said plurality of output power switching stages, in association with induced current in the output inductor of said each output power switching stage resulting from current flow through a mutually coupled inductor of another of each of said output power switching stages, wherein said induced current is prevented from flowing through a body-diode of said first power switch of said each output power switching stages.

14. The method according to claim 12, wherein said DC-DC converter comprises a multi-phase, discontinuous mode buck-mode DC-DC converter, said primary switching signals comprise pulse width modulation (PWM) waveforms, and wherein said step (b) comprises generating said auxiliary signals as auxiliary on-time pulse width portions inserted into PWM waveforms and applying the resulting PWM waveforms to power switches of said plurality of output power switching stages for controlling times during which power switches thereof are conductive to provide current flow paths therethrough, said auxiliary on-time pulse width portions being effective to turn-on first power switches of respective ones of said plurality of output power switching stages, in association with induced current in the output inductor of said respective ones of said output power switching stage resulting from current flow through a mutually coupled inductor of another output power switching stage, wherein said induced current is prevented from flowing through body-diodes of said first power switches of said respective ones of said plurality of output power switching stages.

15. The method according to claim 12, wherein said DC-DC converter comprises a single-phase, discontinuous mode buck-mode DC-DC converter, said step (a) comprising applying said primary switching signals as discontinuous pulse width modulation (PWM) waveforms to only a first of said output power switching stages for controlling times during which power switches thereof are conductive to provide current flow paths therethrough, and said step (b) comprising generating said auxiliary signals as auxiliary PWM switching signals and applying said auxiliary PWM switching signals to a first power switch of a second of said output power switching stages for controlling times during which said first power switch is conductive to provide a current flow path therethrough, said auxiliary PWM switching signals being effective to turn-on said first power switch of said second output power switching stage, in association with induced current in the output inductor of said second of said output power switching stage resulting from current flow through a mutually coupled inductor of said first output power switching stage, wherein said induced current is prevented from flowing through a body-diode of said first power switch of said second output power switching stage.

16. The method according to claim 12, wherein said DC-DC converter comprises a single-phase, continuous mode buck-mode DC-DC converter, said step (a) comprising applying said primary switching signals as complementary pulse width modulation (PWM) waveforms to respective power switches of only a first of said output power switching stages for controlling times during which said respective power switches thereof are conductive to provide current flow paths therethrough, and said step (b) comprising generating said auxiliary signals as auxiliary PWM switching signals, and applying said auxiliary PWM switching signals to a first power switch of a second of said output power switching stages for controlling times during which said first power switch of said second output power switching stage is conductive to provide a current flow path therethrough, said auxiliary PWM switching signals being effective to turn-on said first power switch of said second output power switching stage, in association with induced current in the output inductor of said second of said output power switching stage resulting from current flow through a mutually coupled inductor of said first output power switching stage, wherein said induced current is prevented from flowing through a body-diode of said first power switch of said second output power switching stage.

* * * * *